United States Patent

[11] 3,628,047

[72] Inventors Donald L. Cronin
Anaheim;
John J. Biess, Canoga Park, both of Calif.
[21] Appl. No. 25,641
[22] Filed Apr. 6, 1970
[45] Patented Dec. 14, 1971
[73] Assignee TRW Inc.
Redondo Beach, Calif.

[54] NONDISSIPATIVE POWER LOSS SUPPRESSION CIRCUIT FOR TRANSISTOR CONTROLLED POWER CONVERTERS
2 Claims, 2 Drawing Figs.

[52] U.S. Cl. .................................................. 307/246,
307/296, 328/67, 307/254
[51] Int. Cl. ....................................................... H03k 17/60
[50] Field of Search ............................................ 328/67;
307/246, 296

[56] References Cited
UNITED STATES PATENTS

| | | | |
|---|---|---|---|
| 3,473,049 | 10/1969 | Alexander ..................... | 307/246 |
| 3,119,968 | 1/1964 | Schonberg ..................... | 328/67 |
| 3,363,184 | 1/1968 | Smith ............................ | 328/67 |
| 3,139,585 | 6/1964 | Ross et al. ..................... | 328/67 |
| 3,259,829 | 7/1966 | Feth .............................. | 307/246 |

*Primary Examiner*—Donald D. Forrer
*Assistant Examiner*—Harold A. Dixon
*Attorneys*—Daniel T. Anderson, Alfons Valukonis and Harry I. Jacobs ABSTRACT: A nondissipative power loss suppression circuit for a transistor controlled DC power converter of the type having a pair of positive and negative input terminals for connection to a source of DC voltage, a power converter inductor having primary and secondary windings, one end of the primary windings being connected to the positive input terminal, a transistor having a base connected to a transistor drive circuit for control of the transistor with turn-on and turnoff pulses, a collector conducted to the other end of the power converter inductor primary winding, and an emitter connected to the negative input terminal, and an output diode in series arrangement for providing a DC voltage output across the arrangement. The power loss suppression circuit consists of an energy absorbing circuit connected to the terminals and the power converter inductor for absorbing input voltage power during a turn-on pulse while said output diode recovers and for transferring excess absorbed power to the source when the diode recovers. Also provided is an energy storage circuit connected to the positive terminal and collector for storing power in the power converter inductor and the energy absorbing circuit during a turnoff pulse. An energy transfer circuit connected to the negative terminal and the energy storage circuit provides for the transfer of energy stored by the energy storage circuit to the source during a succeeding turn-on pulse.

Patented Dec. 14, 1971

3,628,047

Donald L Cronin
John J Biess
INVENTORS

BY

*Alfons Valukonis*

AGENT

NONDISSIPATIVE POWER LOSS SUPPRESSION CIRCUIT FOR TRANSISTOR CONTROLLED POWER CONVERTERS

BACKGROUND OF THE INVENTION

1. Field of the Invention

This invention relates generally to DC power converters, and more particularly to nondissipative power loss suppression circuits for DC power converters.

2. Description of the Prior Art

In a transistor switched DC power converter, the switching transistor is subjected to high power dissipation. The power loss during the application of a turn-on pulse to the transistor is caused by the recovery of the output diode in the converter. The power loss during turnoff is caused by the inductive energy stored in the magnetic components of the converter. Heretofore, transistor controlled DC power converters utilized RC circuits to improve the switching characteristics of the transistors used, but the excess energy produced was merely dissipated in the resistor of the RC circuit with no improvement in converter efficiency. The nondissipative power loss suppression circuit of the present invention eliminates these problems, and provides the power converter transistor with improved switching characteristics, and greater power transfer efficiency to the DC converter.

SUMMARY OF THE INVENTION

A power loss suppression circuit for a transistor controlled DC power converter of the type having a pair of positive and negative input terminals for connection to a source of DC voltage, a power converter inductor having primary and secondary windings, one end of the primary winding being connected to the positive input terminal, a transistor having a base connected to a transistor drive circuit for control of the transistor with turn-on and turnoff pulses, a collector connected to the other end of the power converter inductor primary winding, and an emitter connected to the negative input terminal, and an output diode in series arrangement for providing a DC voltage output across the arrangement. The power loss suppression circuit comprises an energy absorbing mans connected to the terminals and the power converter inductor for absorbing input voltage power during a turn-on pulse while the output diode recovers and for transferring excess absorbed power to the source when the diode recovers. Also provided is an energy storage means connected to the positive terminal and the collector for storing power in the power converter inductor and the energy absorbing means during a turnoff pulse. An energy transfer means is connected to the negative terminal and the energy storage means for transferring energy stored by the energy storage means to the source during a succeeding turn-on pulse. The power loss suppression circuit of the present invention provides the transistor of the DC power converter with good switching characteristics and provides high efficiency to the power converter. Also by providing nondissipative power switching, the operating frequency of the DC converter can be increased and the equipment weight reduced.

DESCRIPTION OF THE PREFERRED EMBODIMENT

Figure 1:
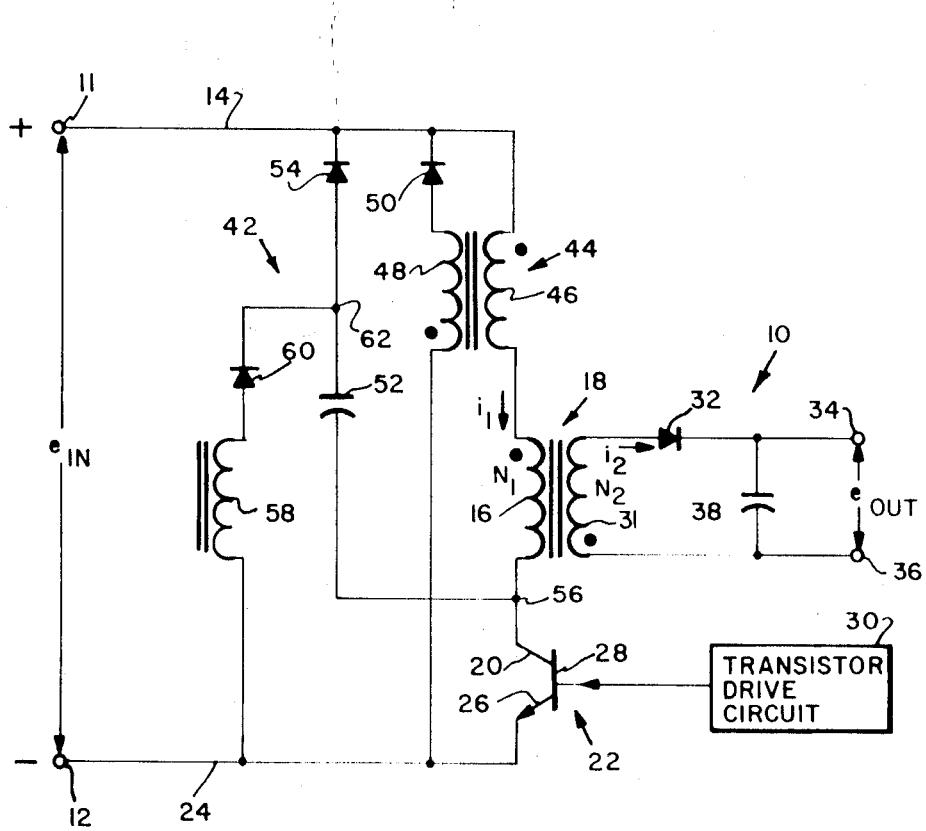
FIG. 1 is a schematic showing of the power loss suppression circuit of the present invention connected to a typical transistor controlled DC power converter.
Figure 2:
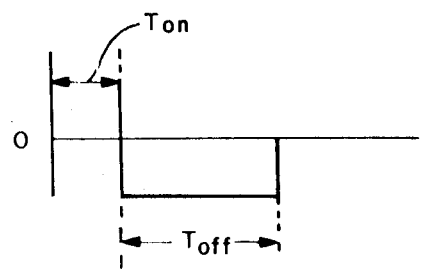
FIG. 2 is a graph showing of turn-on and turnoff pulses applied to the transistor of the circuit of FIG. 1.

Referring to FIG. 1 there is shown a power converter circuit incorporating the power loss suppression circuit of the present invention. The power converter circuit, generally designated by the numeral 10, consists of a pair of terminals 11 and 12 adapted to be connected to a source of DC voltage (not shown) capable of supplying a DC input voltage $e_{in}$ to the circuit. A line 14 connects one end of the primary winding 16 of an inductor 18 to the terminal 11. The other end of the winding 16 is connected to the collector 20 of a transistor generally designated by the numeral 22. The winding 16 has $N_1$ turns. Another line 24 connects the emitter 26 of the transistor to the terminal 12. The base 28 of the transistor is connected to a transistor drive circuit 30 capable of supplying turn-on and turnoff pulses, $T_{on}$ and $T_{off}$, respectively, as shown in FIG. 2, to externally control the transistor 22 and the power converter. The secondary winding 31, which has $N_2$ turns, is connected in series arrangement with a diode 32 across output terminals 34 and 36 which supply the output DC voltage $e_{out}$. A filter capacitor 38 is connected across the terminals 34 and 36, and completes the power converter circuit.

The power loss suppression circuit of the present invention is generally designated by the numeral 42 and consists of an inductor 44 having one winding 46 connected in series with the winding 16 of the inductor 18 in the line 14. The other winding 48 of the inductor is connected in series arrangement with a diode 50 across the lines 14 and 24. A series arrangement of a capacitor 52 and a diode 54 is connected to the line 14 and connection 56 interconnecting the winding 16 of inductor 18 and the collector 20 of the transistor 22. An inductor 58 in series connection with a diode 60 is connected between the line 24 and the connector 62, connecting the capacitor 52 and diode 54.

Operation of the circuit shown in FIG. 1 is as follows: During the time interval $T_{on}$, the transistor 22 is switched on by the drive circuit 30 and current $i_1$ in the winding 16 of the inductor 18 causes the inductor to absorb energy from the DC source (not shown). Meanwhile, the diode 32 blocks any current in the winding 31 of the transformer 18. Thus, a predetermined quantity of energy is stored in the inductor 18 during the period $T_{on}$. When the transistor 22 is turned off by the application of the $T_{off}$ pulse to its base 28, a current $i_2$ flows immediately through the diode 36 to charge the filter capacitor 38. The energy stored in the inductor 18 is thus released to the capacitor 38 during the period $T_{off}$. It can be demonstrated that $$\frac{e_{out}}{e_{in}} = \frac{N_2}{N_1} \frac{T_{on}}{T_{off}} \qquad (1)$$

Thus, despite a variation in input voltage $e_{in}$, a constant output voltage $e_{out}$ can be maintained by controlling the ration $T_{on}/T_{off}$ with the transistor drive circuit 30.

However, during switching periods $T_{on}$ and $T_{off}$, the transistor 22 would normally be subjected to high power dissipation. The power loss during turn-on time $T_{on}$ is due to the forward recovery time of the diode 32. The power loss during turnoff time $T_{off}$ is caused by the inductive energy stored in the transformer 18. However, the passive circuit 42 recovers these switching power losses and feeds them back to the power source (not shown). During the turn-on time $T_{on}$ the inductor 44 absorbs the input voltage $e_{in}$ until the output diode 32 recovers. After diode recovery is achieved, the input voltage $e_{in}$ is found across the winding 16 of the inductor 18, and any excess energy in the inductor 44 is returned to the DC source (not shown) through winding 48 of inductor 44 and diode 50. When the transistor 22 is turned-off, during $T_{off}$, the energy in the inductors 18 and 44 is transferred to the capacitor 52 through diode 54 and no power loss occurs across the transistor 22. When the transistor is turned-on during the next cycle turn-on period $T_{on}$, the energy in capacitor 52 is transferred to the inductor 58 through diode 60 which in turn transfers the energy back to the DC source (not shown) through diodes 60 and 54.

We claim:

1. A power loss suppression circuit for a transistor controlled DC power converter of the type having a pair of positive and negative input terminals for connection to a source of DC voltage, a power converter inductor having primary and secondary windings, one end of the primary winding being connected to the positive input terminal, a transistor having a base connected to a transistor drive circuit for control of the transistor with turn-on and turnoff pulses, a collector connected to the other end of the power converter inductor primary winding, and an emitter connected to the negative input terminal, and an output diode in series arrangement for providing a DC voltage output across the arrangement, said power loss suppression circuit comprising:

energy absorbing means connected to the terminals and said power converter inductor for absorbing input voltage power during a turn-on pulse while said output diode recovers and for transferring excess absorbed power to the source when the diode recovers, said energy absorbing means comprising an inductor having primary and secondary windings, said primary winding having one end connected to the negative terminal and the other end connected to a first diode, said first diode connected to the positive terminal, said secondary winding being in series arrangement with the power converter inductor primary winding and having one end connected to the positive terminal;

energy storage means connected to the positive terminal and the collector for storing power in said power converter inductor and said energy absorbing means during a turnoff pulse, said energy storage means comprising a first capacitor and a second diode in series arrangement, said series arrangement being connected to the positive terminal and the transistor collector; and energy transfer means connected to the negative terminal and said energy storage means for transferring energy stored by said energy storage means to the source during a succeeding turn-on pulse, said energy transfer means comprising a third inductor having a winding, and a diode connected in series arrangement with said third inductor winding, said series arrangement being connected to the negative terminal and said energy storage means.

2. A power loss suppression circuit comprising:

a first input terminal receiving positive direct current voltage;

a second input terminal receiving negative direct current voltage;

a first inductor having primary and secondary windings;

said first inductor primary winding connected in series with a first diode and the series combination shunted across said first and second terminals;

a second inductor having primary and secondary windings;

a first transistor having a base, emitter and collector terminals;

said first inductor secondary winding, said second inductor primary winding and the collector-to-emitter path of said first transistor connected in series, and the series combination shunted across said first and second terminals;

a second diode and first capacitor connected in series, the free end of said second diode connected to said first terminal and the free end of said first capacitor connected to the juncture of said second inductor primary winding and the collector of said first transistor;

a third inductor having a single winding connected in series with a third diode, the combination shunted between said second terminal and the juncture of said second diode and first capacitor, and a fourth diode and a second capacitor connected in series and the combination shunted across the secondary winding of said second inductor.

* * * * *